United States Patent
Verbockhaven

[19]

[11] Patent Number: 5,887,610
[45] Date of Patent: Mar. 30, 1999

[54] METHOD AND PLANT FOR REGULATING THE COMPOSITION OF THE ATMOSPHERE IN AN ENCLOSURE

[75] Inventor: Denis Verbockhaven, Paris, France

[73] Assignee: L'Air Liquide, Societe Anonyme pour l'Etude et l'Exploitation des Procedes Georges Claude, Paris, France

[21] Appl. No.: 961,950

[22] Filed: Oct. 31, 1997

[30] Foreign Application Priority Data

Oct. 31, 1996 [FR] France ................................... 96 13331

[51] Int. Cl.$^6$ ................................................. G05D 11/13
[52] U.S. Cl. .................................. 137/3; 137/93; 137/112
[58] Field of Search .................... 137/93, 88, 89, 137/112, 3; 34/527, 566

[56] References Cited

U.S. PATENT DOCUMENTS

| | | | |
|---|---|---|---|
| 3,434,488 | 3/1969 | Talbot ........................................... | 137/3 |
| 3,727,626 | 4/1973 | Kanwisher et al. ....................... | 137/88 |
| 4,223,450 | 9/1980 | Rothchild .............................. | 137/93 X |
| 4,369,803 | 1/1983 | Furr ........................................ | 137/88 X |
| 4,651,728 | 3/1987 | Gupta et al. ........................ | 128/201.28 |
| 4,991,616 | 2/1991 | Fabregat ..................................... | 137/93 |
| 5,313,973 | 5/1994 | Fabregat ...................................... | 137/3 |
| 5,435,332 | 7/1995 | Heinonen ..................................... | 137/3 |
| 5,495,875 | 3/1996 | Benning et al. ......................... | 137/3 X |

FOREIGN PATENT DOCUMENTS

| | | |
|---|---|---|
| 100649 | 2/1984 | European Pat. Off. . |
| 549262 | 6/1993 | European Pat. Off. . |
| 2691678 | 12/1993 | France . |

*Primary Examiner*—Stephen M. Hepperle
*Assistant Examiner*—John Bastianelli
*Attorney, Agent, or Firm*—Burns, Doane, Swecker & Mathis, LLP

[57] ABSTRACT

Method of regulating the level of a given element in an atmosphere of an enclosure to a value below a predetermined upper limit ($L_h$), comprising the steps of:

a) providing at least a first gas source and a second gas source, the level of said element in the first source being greater than the level of the element in the second source;

b) under nominal conditions, using the first gas source to supply the enclosure with a nominal flow rate $Q_n$;

c) measuring the level of the element in the atmosphere of the enclosure at at least one point in the enclosure to obtain a measurement;

d) if the result of the measurement taken during step c) is greater than a first predetermined upper threshold ($L_h - \epsilon$), cutting the supply to the enclosure from the first gas source and supplying the enclosure from the second gas source at a flow rate equal to, or substantially equal to, $Q_n$;

e) measuring the level of the element in the atmosphere of the enclosure at at least the point in the enclosure to obtain a measurement result, and cutting the supply to the enclosure from the second source in order to resume the supply to the enclosure under nominal conditions as soon as the result of the measurement is less than a second predetermined upper threshold ($L_h - \alpha$).

19 Claims, 1 Drawing Sheet

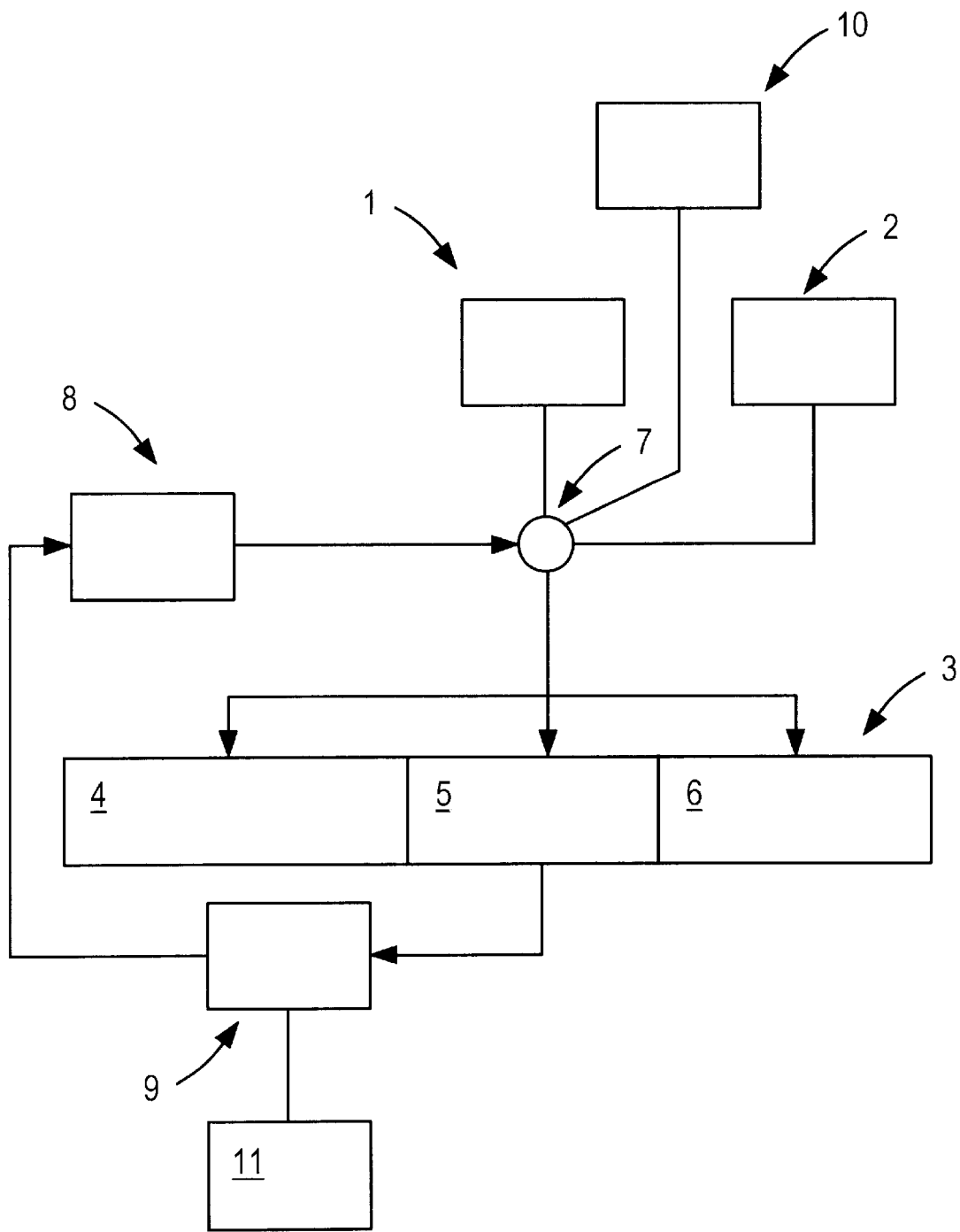
FIGURE

METHOD AND PLANT FOR REGULATING THE COMPOSITION OF THE ATMOSPHERE IN AN ENCLOSURE

BACKGROUND OF THE INVENTION

1. Field of the Invention

The present invention relates to the regulation of the composition of an atmosphere in an enclosure, for example a furnace or oven.

By way of illustration, mention may be made here of the example of regulating the oxygen level in nitrogen-based atmospheres used for heat treatment applications carried out on metal or ceramic articles, or alternatively for soldering operations.

2. Description of Related Art

Selecting an atmosphere of given composition, for carrying out a certain operation in the enclosure (for example a heat treatment operation), most often entails definition of at least one maximum level of a given element in this atmosphere.

By way of example, selecting a nitrogen-based atmosphere for a specific process very often entails definition of a maximum oxygen level in this atmosphere. A case which may be considered by way of illustration is that of mounting electronic components on a printed circuit using a soldering paste, in so-called reflow ovens, for which the use of certain soldering paste formulations gives rise to recommendations in terms of the maximum tolerable oxygen level in the soldering atmosphere.

It will therefore be understood that the required nitrogen-based atmosphere will always be obtained from a nitrogen source in which the oxygen level is less than the maximum acceptable level in the process atmosphere, in view of the conventional precautions taken in terms of injection and regulation (the flow rates which are used, the geographical distribution of the injections, the leak tightness of the enclosure, etc.).

It is further known that, for a given gas source and a given configuration of the enclosure and the setting of the operating parameters of this enclosure, the level of oxygen (and more generally of the element in question) in the process atmosphere will often vary, in particular on the basis of the production rate of the processing enclosure, or alternatively because of external conditions such as the creation of air currents in the workshop where the enclosure in question is located.

Even so, a clear desire is increasingly being felt by users to gain better control over their processes, in order to achieve better reproducibility in the quality of the articles delivered from the enclosure.

Process control of this type necessarily involves controlling the atmosphere which is used inside the enclosure, it clearly being insufficient just to control the quality of the gas sources which are supplied.

With regard to the example of nitrogen-based atmospheres having a controlled oxygen level, existing solutions for providing such atmosphere control can essentially be put into two categories:

Solution No. 1: Excess quality

According to this first solution, use is made of regulation (flow rate and distribution of the injections) and a nitrogen source with given oxygen purity, which are such that, for any variations or disturbances which occur in the process, the residual oxygen level measured in the process atmosphere is always less than the maximum acceptable level.

By way of example, a high flow rate of cryogenically produced nitrogen could be used here, even though the user process could readily tolerate a few thousands, or even a few tens of thousands of ppm of residual oxygen.

Solution No. 2: Atmosphere control by flow rate regulation

According to this second solution, use is made of a degree of regulation (flow rate and distribution of the gas injections) and a source of nitrogen with given oxygen purity, which are limited enough for there actually to be variations or disturbances in the operation of the enclosure, which may cause the maximum acceptable residual oxygen level to be exceeded in the process atmosphere.

The gas source is then used in combination with a regulation system which, when the residual oxygen level measured in the atmosphere of the enclosure exceeds a given upper threshold, makes it possible to increase the flow rate of gas into the enclosure (which is then in an "excess atmosphere" situation), the flow rate of gas injected into the enclosure being reduced again only when the oxygen level measured in the process atmosphere has returned below the threshold.

It can therefore be seen that, on the one hand, the first solution, like all solutions using excess quality, is needlessly expensive, and yet without completely eliminating the risk of an unexpected disturbance leading to the maximum acceptable residual oxygen level being exceeded in the process atmosphere.

For its part, the second solution does indeed allow the purity of the gas source and/or the flow rate used to be adapted better to the actual process requirements, but may nevertheless in the long term lead to a relatively high total gas consumption. It may further be noted that the fact that modification the flow rates used in the enclosure in this way when the oxygen threshold is exceeded, inevitably entails instability phenomena in the process:

the induced flow rate variation is, on the one hand, a source of turbulence which promotes air being taken into the enclosure;

such a variation in the flow rate used further leads to a variation in the (convective) heat transfer produced inside the enclosure when the enclosure is the site of such a heat treatment operation.

Mention may further be made of the fact that even though, in most cases, the selection of a controlled atmosphere for a process entails definition of a maximum level of a given element in this atmosphere, there are cases in which it is necessary to define not only a maximum level but also a minimum level, which is equivalent to defining a tolerable range for the element in question in the atmosphere. Mention may be made here by way of illustration of the case of soldering electronic components onto a printed circuit using a soldering paste, for which the observation, in the case of soldering under nitrogen as a replacement for air, of a number of new defects such as the tombstoning effect, also referred to as the Manhattan effect (an electronic component lifting off during the soldering phase, leading to opening of the electrical circuit), has led to the adoption of tolerable intervals for the oxygen level in the nitrogen, in order to avoid the presence of these defects. This application example will be dealt with in more detail below in the scope of the present application.

SUMMARY OF THE INVENTION

The present invention proposes to provide an atmosphere regulation method which makes it possible to overcome these problems.

The atmosphere regulation process according to the invention is based on the use of two gas sources which have different levels of the element which is to be regulated: a first gas source having a "high" level of the element in question ("low purity" source), and a second gas source having a "low" level of the element in question ("high purity" source).

The levels of the element in question in the two gas sources must be less than the maximum allowable level for the process in question.

A first upper threshold and a second upper threshold are then defined for the level of the element in question measured in the atmosphere of the enclosure (the first threshold being greater than the second), regulation being carried out with a mode of injection which is constant, or substantially constant (in terms of flow rate and distribution of the points of injection into the enclosure) in the following way: a change is made from the first gas source to the second gas source when the level of the element in question in the atmosphere of the enclosure exceeds the first upper threshold, and the first gas source (low purity) is returned to when the level of the element in question, measured in the atmosphere of the enclosure, returns below the second predefined upper threshold.

The very significant advantages provided by the regulation solution according to the invention are therefore immediately apparent, this solution actually being based on regulating the level of the element in question in the process, making it possible to optimize the selection of the level of the element in the main gas source which is used in comparison with an excess quality solution, while minimizing the gas consumption, the method further making it possible to avoid the problems of instability (turbulence, thermal, etc.) connected with the flow rate variations, since the regulation is carried out with a substantially constant injection mode.

BRIEF DESCRIPTION OF THE DRAWINGS

The FIGURE depicts a reflow oven having three zones.

DETAILED DESCRIPTION OF PREFERRED EMBODIMENTS

The method according to the invention of regulating the level of a given element in the atmosphere of an enclosure to a value below a predetermined upper limit ($L_h$) is characterized by the utilization of the following measures:

a) at least a first gas source and a second gas source are provided, the level of said element in the first source being greater than the level of said element in the second source;

b) under nominal conditions, the first gas source is used to supply the enclosure with a nominal flow rate $Q_n$;

c) the level of said element in the atmosphere of the enclosure is measured;

d) if the result of the measurement taken during the preceding step is greater than a first predetermined upper threshold ($L_h-\epsilon$), the supply to the enclosure from the first gas source is cut and the enclosure is supplied from the second gas source at a flow rate equal to, or substantially equal to, $Q_n$;

e) the level of said element in the atmosphere of the enclosure is measured, and the supply to the enclosure from the second gas source is cut in order to resume the supply to the enclosure under nominal conditions as soon as the result of the measurement is less than a second predetermined upper threshold ($L_H-\alpha$), the second upper threshold being less than the first upper threshold.

It can be seen that the values of the first and second upper thresholds will need to be established case by case, in particular in accordance with the enclosure and the relevant process which takes place in the enclosure (replenishment rate of the gas which is employed, etc.).

As will be relatively apparent to the person skilled in the art, the regulation method according to the invention utilizes a constant or "substantially" constant flow rate, but it will actually be understood that it would be fully within the scope of the present invention if a slight flow rate variation were to occur on changing from one gas source to another, for example because of the varying quality of the flow rate regulation equipment used. It may then be considered that a flow rate variation of less than or equal to 10%, or even 15%, remains within the scope of the present invention, namely of using a constant or "substantially" constant flow rate during changes of gas source.

The level measurements according to the invention may, depending on the case, be carried out continuously over time or discontinuously, at intervals which may or may not be regular (sampling).

According to an advantageous embodiment of the invention, a third upper threshold is used, so that if, at any instant, the level of said element measured in the atmosphere of the enclosure is greater than this third threshold, a visual or audible alarm measure, or a determined action on the operating parameters of the enclosure or on the environment of the enclosure, is initiated.

It will be understood that this third threshold may be particularly useful for detecting a situation in which the level in the atmosphere of the enclosure rises to an abnormally high level in spite of the fact that there has been a change to the second gas source ("high purity" source). This third threshold is then, in any event, selected above $L_h-\epsilon$, but will more preferably be selected to be more than $L_h$ ($L_H+m$).

By way of illustration, such an action on the environment of the enclosure may, for example, consist in ceasing to supply the enclosure with articles to be treated, in view of the substantial degradation of the atmosphere beyond the third upper threshold.

The regulation method according to the invention can be implemented under conditions in which the first upper threshold is equal to the second upper threshold ($\epsilon=\alpha$), but it will be advantageous to use two different upper threshold values. This is because the presence of a second upper threshold which is less than the first makes it easier to reach a good compromise in the respective use of the two gas sources:

if $\epsilon=\alpha$: when the situation in question involves a leak, the risk is run of switching from one gas source to the other too often, which may be problematic for the equipment for utilizing the gases;

selecting $\epsilon \neq \alpha$ moreover makes it possible to detect a case in which the level of the element in question in the atmosphere of the enclosure falls back abnormally slowly in spite of the fact that there has been a change from the first gas source to the second, purer gas source.

During step e), measured level data will then advantageously be acquired and stored, in order to evaluate the rate of decrease of the measured level as a function of time. Using a unit for processing these data, it will then actually be possible to evaluate and detect the cases in which the rate of decrease of the measured level is abnormally small, leading to the enclosure being kept under supply from the second gas source for an abnormally long time, without being able to return to the nominal situation.

If the rate is less than a predetermined value, it will then, for example, be possible to initiate one of the following measures:

the initiation of a visual or audible alarm;

making the processing system modify the value of the second upper threshold ($L_h-\alpha$), which is in this case too low (for example because of localized impairment of the operation of the enclosure, for example due to a leak or alternatively a flow of air in the workshop containing the processing enclosure), in order to make it possible to return to supplying the enclosure under nominal circumstances.

Mention has just been made of the advantage which, according to the invention, there is in storing the level data obtained during step e), but it is clear that it could be advantageous to store the measurements of the level of the element in question in the atmosphere of the enclosure during some or all of the operation of this enclosure, for example for the following reasons:

in order to make it possible to trace the origin of a defect observed on certain articles processed in the enclosure;

to evaluate the gas consumption of the enclosure over time;

as a means for diagnosis of the operation of the enclosure, the regulation, etc.

As before, storage of this type may take place both on the basis of measurements taken continuously and on the basis of measurements taken discontinuously (sampling).

According to one of the embodiments of the invention, at least a third gas source is provided, in which the level of said element is greater than the level of said element in the first gas source, in order, if appropriate, to regulate the level of the element in question in the atmosphere of the enclosure between a specific lower limit $L_b$ and the predetermined upper limit $L_n$ mentioned above.

Regulation of this type can then be carried out using two predetermined lower thresholds $L_b+\epsilon_2$ and $L_b+\alpha_2$ in the following way: if, at any instant, the level of the element in question in the atmosphere of the enclosure is below the first lower threshold of $L_b+\epsilon_2$, the supply to the enclosure from the first gas source is cut and the enclosure is supplied from the third gas source, at a flow rate equal to, or substantially equal to, $Q_n$. Supply to the enclosure under nominal circumstances is resumed only when the result of the measurement of the level of the element in question in the atmosphere of the enclosure has risen back above the second predetermined lower threshold ($L_b+\alpha_2$).

This type of degradation of the atmosphere, leading to a reduction in the level of the element in question in the atmosphere of the enclosure to below the first lower threshold of $L_b+\epsilon_2$, may, for example, be involved in the event of a variation over time of the gas source which is used. By way of illustration, the following examples may be mentioned: an instantaneous variation in the residual oxygen level of the impure nitrogen produced by an air separator operating using a membrane or selective adsorption, or alternatively the variation in the atmosphere obtained at the output of a deoxygenator of the DEOXO type.

The respective situation of the various thresholds which are used is as follows:

the first lower threshold is less than the second lower threshold, the first lower threshold is less than the upper limit $L_h$ and the first upper threshold $L_{h-}\epsilon$;

however, as regards the respective situation of the second lower threshold $L_b+\alpha_2$ and of the second upper threshold $L_{h-}\alpha$, any situation may be envisaged.

The third gas source which is used may be a source which is fully independent of the other two sources (adjacent source). However, a modification to one of the other sources may also be used as the third source.

By way of illustration, mention may be made of the example of a case in which the element in question, which is to be controlled, is oxygen, in which case the following gas sources may be used:

1st source: impure nitrogen having 10,000 ppm of residual oxygen, obtained through air separation by permeation;

2nd source: cryogenically produced nitrogen;

3rd source: a mixture of impure nitrogen from the first source, and air, in order to obtain a residual oxygen level of, for example, close to 30,000 ppm.

According to one of the embodiments of the invention, the element in question, the level of which is regulated in the atmosphere of the enclosure, is oxygen.

According to one of the embodiments of the invention, the various gas sources used are nitrogen sources having differentiated residual oxygen levels.

It will be understood that the regulation method according to the invention can be applied to a very wide variety of situations of enclosures using a controlled atmosphere.

Purely by way of illustration, mention will be made here of the case of furnaces in which a heat treatment operation is carried out, or alternatively, ovens or machines in which hard or soft soldering operations are carried out, for example involving the soldering of components onto electronic circuits.

Other characteristics and advantages of the present invention will emerge from the following description of embodiments which is given by way of illustration but without implying any limitation, and is made with reference to the appended figure which represents a schematic view of a plant suitable for implementing the method according to the invention.

The appended figure illustrates the case of implementing the method according to the invention in order to regulate the oxygen level in a nitrogen-based atmosphere used for soldering electronic components in a reflow oven.

The figure shows the presence of a reflow oven 3, essentially having three zones: a preheating zone 4, a zone 5 in which the reflow peak is established, and a cooling zone 6.

At its three zones, the oven 3 is supplied from two gas sources, a first gas source 1 and a second gas source 2.

First gas source 1, the "low purity" source, here consists of an air separator using a membrane, which produces impure nitrogen containing of the order of 10,000 ppm of residual oxygen. The second gas source 2 the "high purity" source, here consists of a tank of liquid nitrogen produced cryogenically, in which the residual oxygen level is less than 10 ppm.

An oxygen analyzer 9, performing analyses of the level of oxygen in the atmosphere of the oven, in at least one of the zones of the oven and preferably the reflow peak zone 5, makes it possible, by sending the oxygen level information which it collects to a regulating system 8 itself acting on a valve system 7, to feed each of the zones of the oven with gas originating from one or other of the gas sources 1 and 2, depending on the oxygen level which is measured a third gas source (10) can be utilized, if desired. Also, if the measurement is greater than a certain threshold, a visual or audible alarm (11) can be initiated.

A plant as described in the context of the appended figure was used to implement illustrative embodiments, comparative or according to the invention, which are described in detail below.

EXAMPLE 1

Comparative

This first example illustrates the case of a reflow oven which is to be supplied with nitrogen, in order to achieve a residual oxygen level in the nitrogen atmosphere of the oven of no more than an upper limit of 2% (20,000 ppm).

For this first example, the "excess quality" solution was used, by employing a source of cryogenically produced nitrogen (residual oxygen level strictly less than 10 ppm), with a flow rate close to 30 m$^3$/h, making it possible to achieve a residual oxygen level of close to 500 ppm in the atmosphere of the oven, this level therefore being actually much less than the upper limit set by the user site.

EXAMPLE 2

Comparative

For the same case as the one described in the context of Example 1, this Example 2 uses the "regulated flow rate" solution.

Use is made here of the source of cryogenically produced nitrogen (residual oxygen level in the gas strictly less than 10 ppm), under the following flow rate conditions:

- a flow rate of 20 m$^3$/h of nitrogen, making it possible to achieve a residual oxygen level in the atmosphere of the oven of the order of 10,000 ppm;
- when the oxygen level in the atmosphere of the oven exceeds a threshold of 15,000 ppm, the flow rate of cryogenically produced nitrogen injected into the oven is immediately raised to 40 m$^3$/h, until the oxygen level falls back below 5000 ppm.

EXAMPLE 3

According to the invention

The same oven situation as the one described above was treated here according to the invention under the following conditions:

- a first, "impure", gas source: impure nitrogen obtained through air separation by permeation, in which the residual oxygen level is close to 10,000 ppm;
- a second, "high purity", gas source: cryogenically produced nitrogen having a residual oxygen level of less than 10 ppm;
- a first upper threshold ($L_h-\epsilon$) according to the invention at 15,000 ppm of $O_2$, and a second upper threshold according to the invention ($L_h-\alpha$) at 5000 ppm of $O_2$, were used:
- a constant flow rate $Q_n$ of 25 m$^3$/h is then used according to the invention, under the following regulating conditions:
- if the measurement of the oxygen level of the atmosphere in the oven is strictly less than 15,000 ppm, the flow rate $Q_n$ of the first gas source 1 is used;
- if the measurement of the residual oxygen level in the atmosphere of the oven is greater than or equal to 15,000 ppm, gas source 2 is used until the measured oxygen level has returned to below 5000 ppm.

such operating conditions made it possible, in a way which was perfectly optimized both in terms of the gas flow rate employed and the quality of the gas sources which were used, to obtain a residual oxygen level in the atmosphere of the oven which was always short of the allowable upper limit as fixed by the user site in question.

As will be readily apparent to the person skilled in the art, even though, in the example in question, the oxygen level is measured at a single point in the oven, in this case at the reflow peak, oxygen measures could without difficulty be taken at several locations in the oven, without thereby departing from the scope of the invention.

Similarly, even though the described example was described using two particular gas sources (cryogenic and membrane), it is clear that other configurations may equally well be envisaged, for example a first source of impure nitrogen obtained through air separation using a membrane or absorption, and a second gas source obtained by deoxidizing this first source on a DEOXO system by reaction with hydrogen or a hydrocarbon.

EXAMPLE 4

According to the invention—with upper and lower thresholds

This illustrative embodiment of the invention was obtained in the case of a reflow oven operating under a nitrogen-based atmosphere, in a situation in which it is desired to remedy the observation of tombstoning-type defects.

It should be recalled here that the use of nitrogen-based atmospheres in reflow ovens is nowadays conventional, making it possible to reduce the degree of oxidation of the metallic surfaces to be soldered, and also, to a lesser extent, to influence the surface tensions of the soldering alloy when it is in the liquid state at the reflow peak.

As is known, nitrogen-based atmospheres of this type lead to a marked improvement in the quality of the soldered joints, in particular in view of the current trend in the microelectronics industry toward greater miniaturization of electronics assemblies, and therefore toward the use of smaller and smaller components, in particular with fine pitch electrical connections.

Various studies have shown that this trend toward using very small components constitutes one of the factors which makes the occurrence of the tombstoning defect more likely.

Although various remedies have been proposed in order to provide a solution to the occurrence of these defects, they without doubt constitute relatively demanding modifications, for example making it necessary to review the design of the printed circuit or alternatively to modify some of the process parameters, for example the temperature profile or alternatively the thickness of soldering paste which is deposited.

For further details, reference may be made to the article by Nobuo Kamada, published in the journal J. Elect. Engineering in February 1994 (page 112), which article also demonstrates the probable role of the oxygen level in the nitrogen-based atmosphere which is used, such as influencing the surface tension of the solder.

It can be deduced from this set of works that some processes for reflow soldering of components onto electronic circuits need to keep to a residual oxygen level in the process nitrogen which is not only less than an upper limit but also greater than a lower limit, which is equivalent to adhering to a range of residual oxygen levels:

an upper oxygen limit making it possible to maintain conditions which are non-oxidizing with respect to the soldered system;

a lower oxygen limit making it possible to limit the occurrence of certain defects such as the tombstoning effect.

The work carried out by the Applicant Company has thus made it possible to demonstrate that, depending on the composition of the soldering paste which is used (in particular connected with its residue level or alternatively to whether or not it is halogenated), various oxygen ranges are recommended.

The residue level of a paste is generally defined as corresponding to the proportion of flux which remains after soldering on the circuit with respect to the quantity initially screen-printed.

For high residue pastes (more than 45%) with halogenated compounds: a residual oxygen level range lying between 1000 ppm and 20,000 ppm most often gives very satisfactory results;

for non-halogenated high residue pastes (more than 45%): a residual oxygen level range lying between 500 ppm and 20,000 ppm most often gives very satisfactory results;

for non-halogenated low residue pastes (less than 45%): a residual oxygen level range lying between 500 ppm and 5000 ppm most often gives very satisfactory results.

The regulating method according to the invention was successfully employed in the case of these three types of soldering pastes, and therefore in the case of these three types of oxygen range, with the use of upper and lower thresholds ($L_h-\epsilon$, $L_h-\alpha$, $L_b+\epsilon_2$, $L_b+\alpha_2$).

The case of a user site using a soldering paste of the halogenated high residue type ($\cong 60\%$) will be illustrated below. Soldering tests made it possible to demonstrate that a nitrogen-based atmosphere containing less than 10,000 ppm of oxygen made it possible, for this soldering paste, to give the best compromise in terms of wetting, microballing or alternatively incidents of "conventional" defects (non-wetting, bridging, etc.).

Further, it was possible to show that, for the circuits which were treated, the tombstoning-type defects occurred for residual oxygen levels in the atmosphere of the oven of less than 2000 ppm.

It was therefore necessary to keep this residual oxygen level in the atmosphere of the oven within the range 2000 ppm–10,000 ppm at all times. To do this, the regulating method according to the invention was implemented under the following conditions:

gas source No. 1: impure nitrogen having 5000 ppm of residual oxygen, obtained by catalytic deoxidation (DEOXO) of nitrogen produced using a membrane and containing 1% of residual oxygen;

gas source No. 2: cryogenically produced nitrogen;

gas source No. 3: nitrogen containing 1% of residual oxygen, as obtained at the output of the membrane separator of the first source, before DEOXO purification;

thresholds used:
first upper threshold ($L_h-\epsilon$): 8000 ppm,
second upper threshold ($L_h-\alpha$): 6000 ppm,
first lower threshold ($L_b+\epsilon_2$): 3000 ppm,
second lower threshold ($L_b+\alpha_2$): 4000 ppm.

What is claimed is:

1. Method of regulating the level of a given element in an atmosphere of an enclosure to a value below a predetermined upper limit($L_h$), comprising the steps of;

a) providing at least a first gas source and a second gas source, the level of said element in the first source being greater than the level of said element in the second source;

b) under nominal conditions, using the first gas source to supply the enclosure with a nominal flow rate $Q_n$;

c) measuring the level of said element in the atmosphere of the enclosure at at least one point in the enclosure to obtain a measurement;

d) if the result of the measurement taken during step c) is greater than a first predetermined upper threshold ($L_h-\epsilon$), cutting the supply to the enclosure from the first gas source and supplying the enclosure from the second gas source at a flow rate equal to, or substantially equal to, $Q_n$;

e) measuring the level of said element in the atmosphere of the enclosure at at least said point in the enclosure to obtain a measurement result, and cutting the supply to the enclosure from the second source in order to resume the supply to the enclosure under nominal conditions from the first gas source as soon as the result of the measurement is less than a second predetermined upper threshold ($L_h-\alpha$).

2. Method according to claim 1, further comprising the step of initiating an alarm or a determined action on an operating parameter of the enclosure or on the environment of the enclosure if, during one of the measurement steps, the result of the measurement is greater than a third predetermined upper threshold ($L_h+m$).

3. Method according to claim 2, where in the enclosure is a site of processing articles which pass through the enclosure in order to undergo treatment there, and wherein said action on the environment of the enclosure comprises ceasing to deliver articles for processing to the enclosure.

4. Method according to claim 1, further comprising, during step e), acquiring and storing measured data in order to make it possible to evaluate the rate of decrease of the measured level as a function of time.

5. Method according to claim 4, further comprising the step of initiating an alarm if the rate of decrease of the measured level is less than a predetermined value.

6. Method according to claim 4, further comprising, if the rate of decrease of the measured level is less than a predetermined value, modifying the value of the second upper threshold ($L_h-\alpha$) in order to make it possible to resume the supply to the enclosure from the first gas source under nominal conditions.

7. Method according to claim 1, wherein the value of the first upper threshold is equal to the value of the second upper threshold.

8. Method according to claim 1, wherein at least a third gas source is provided having a level of said element which is greater than the level of said element in the first gas source, in order, if appropriate, to regulate the level of said element in the atmosphere of the enclosure between a predetermined lower limit $L_b$ and the predetermined upper limit $L_h$, said method further comprising the steps of:

i) if the result of the measurement taken during step c) is less than a first predetermined lower threshold $L_b+\epsilon_2$, cutting the supply to the enclosure from the first gas source and supplying the enclosure from the third gas source, at a flow rate equal to, or substantially equal to, $Q_n$;

ii) measuring the level of said element in the atmosphere of the enclosure, and cutting the supply to the enclosure from the third gas source, in order to resume the supply to the enclosure under nominal conditions from the first gas source, as soon as the result of the measurement is greater than a second predetermined lower threshold ($L_b+\alpha_2$), the first lower threshold being less than the second lower threshold.

9. Method according to claim 1, wherein said element whose level is regulated is oxygen.

10. Method according to claim 9, wherein said gas sources are sources of nitrogen having different residual oxygen levels.

11. Method according to claim 10 wherein said second gas source is cryogenically produced nitrogen, and said first gas source is impure nitrogen obtained through air separation by selective permeation or adsorption.

12. Method according to claim 1, wherein the enclosure is a furnace or oven in which a heat treatment operation or a soldering operation is carried out.

13. Method according to claim 2, wherein said alarm which is initiated is a visual or audible alarm.

14. Method according to claim 5, wherein the alarm is a visual or audible alarm.

15. Plant for regulating the level of a given element in an atmosphere of an enclosure to a value less than a predetermined upper limit ($L_h$), comprising:

i) at least a first gas source and a second gas source, which are connected to the enclosure, the level of said element in the first source being greater than the level of said element in the second source;

j) means for supplying the enclosure under nominal circumstances with gas from the first gas source at a nominal flow rate $Q_n$;

k) means for analyzing the level of said element in the atmosphere of the enclosure at at least one point in the enclosure to obtain a result;

l) means, if the result of the analysis of said level is greater than a first predetermined upper threshold ($L_h-\epsilon$), for (i) cutting the supply to the enclosure from the first gas source and (ii) for supplying the enclosure with gas from the second gas source, at a flow rate equal to, or substantially equal to, $Q_n$, and (iii) for resuming the supply to the enclosure under nominal conditions from the first gas source as soon as the result of the analysis of said level is less than a second predetermined upper threshold ($L_h-\alpha$).

16. A method for regulating an atmosphere comprising at least one element such that said element is present in said atmosphere at a level below a maximum predetermined level, wherein said method comprises the steps of:

(i) feeding a first gas including said element at a first level into an area containing said atmosphere;

(ii) if the level of said element in said area exceeds a first upper threshold level, discontinuing the feeding of said first gas and feeding a second gas including said element at a second level into said area, wherein (a) said second level is lower than said first level and (b) said second and first levels are lower than said maximum predetermined level;

(iii) if the level of said element in said area goes below a second upper threshold level, discontinuing the feeding of said second gas and resuming the feeding of said first gas into said area, wherein said second upper threshold level is lower than said first upper threshold level.

17. The method according to claim 16, wherein said first or second gases are fed into said area substantially continuously.

18. The method according to claim 16 further comprising the step of initiating an alarm if the level of said element exceeds a third upper threshold level, wherein said third upper threshold level is greater than said first and second upper threshold levels.

19. The method according to claim 18, wherein said third upper threshold level is greater than said maximum predetermined level.

* * * * *